United States Patent [19]
Ekdahl et al.

[11] Patent Number: 5,468,072
[45] Date of Patent: Nov. 21, 1995

[54] SYSTEM AND METHOD FOR SUPPORTING A SHAFT OR AXLE IN A SUPPORT COMPONENT

[75] Inventors: Egon Ekdahl, Kungsbacka, Sweden; Jiri Gurka, Behamberg, Austria; Rupert Huber, Steyr, Austria; Hubert Köttritsch, Amstetten, Austria; Gottfried Kufe, Traun, Austria; Johann Müllner, Steyr, Austria; Helmut Weninger, Steyr, Austria

[73] Assignee: SKF GmbH, Schweinfurt, Germany

[21] Appl. No.: 216,804

[22] Filed: Mar. 23, 1994

[30] Foreign Application Priority Data

Mar. 26, 1993 [DE] Germany ............... 93104990.2

[51] Int. Cl.⁶ .................................................. F16C 19/00
[52] U.S. Cl. ........................ 384/448; 384/446; 384/544; 384/539; 384/476; 384/537
[58] Field of Search ............................ 384/448, 446, 384/544, 539, 537, 476, 510

[56] References Cited

U.S. PATENT DOCUMENTS 4,615,626 10/1986 Iwaki ........................ 384/539
4,958,944 9/1990 Hofmann et al. ........... 384/539
4,986,607 1/1991 Hofmann et al. ........... 384/537
5,209,701 5/1993 Ishikawa et al. ............ 384/544

Primary Examiner—Lenard A. Footland
Attorney, Agent, or Firm—Eugene E. Renz, Jr.

[57] ABSTRACT

A system for supporting a shaft member at one end of a support component, including a bearing inner ring and a bearing outer ring, a row of rolling elements in the space between the rings, characterized in that the bearing outer ring (1,27, 34) has a radially outwardly directed flange (2) which can be fastened to the support component (9), the bearing inner ring (3), (32) having a radially inwardly directed flange 4 which can be fastened to the end surface of the shaft member (11), a cylindrical centering surface (15) on the bearing outer ring (1), (27), (34) for centering guidance in a corresponding bore in the support component (9), a cylindrical centering surface (13) on the bearing inner ring for centering guidance on a corresponding section of the shaft member (11).

17 Claims, 6 Drawing Sheets

SYSTEM AND METHOD FOR SUPPORTING A SHAFT OR AXLE IN A SUPPORT COMPONENT

FIELD OF THE INVENTION

The present invention relates to a new and improved system and method for supporting a shaft or axle in a support component, such as the drive shaft of a traction motor. For example, the invention has application in supporting the drive shaft of a traction motor of an electrical traction vehicle in the motor housing.

BACKGROUND OF THE INVENTION

Broadly speaking, the method and system of the type to which the present invention relates are not new per se. For example, German Patent No. 4,138,867 shows a rail vehicle wherein a shaft is supported by a means of a roller bearing in a support component mounted on the rail vehicle. More specifically, the outer ring of the conical roller bearing is mounted by a press fit in a narrow tolerance bore in the support component and the inner ring is mounted on a seating surface of the shaft by a press fit and held in a predetermined axial position by lockwashers or rings secured to the shaft or housing. The assembly is in a sealed environment including a labyrinth seal having an outer sealing ring which is located in a recess milled into the outer ring of the bearing and wherein the inner sealing ring is mounted on the shaft.

It has been found that the prior art systems described above have certain disadvantages and drawbacks. For example, in these prior designs, it is necessary to provide a very precise and accurate fit in the bore of the support component and in the bore of the shaft and it is likewise imperative to prevent the bearing rings from rotating with the seating surfaces which can occur under certain unfavorable operating conditions which leads to damage and destruction of the seating surfaces. Furthermore, these bearing assemblies consist of a multiplicity of unconnected components which are rather complicated and cumbersome to disassemble the bearing. This also makes reinstallation difficult and it has been observed that it increases the risk of damaging the individual components of the bearing.

SUMMARY OF THE INVENTION

With the foregoing in mind, an object of the present invention is to provide a system and method which overcomes the disadvantages and the drawbacks of the prior art systems discussed above and provide a design which is easy to install and remove, which does not require highly precise fits between parts and which nevertheless produces security against turning of the bearing rings relative to the seating surface or movement thereof in an axial direction.

To this end, the outer bearing ring has a radially outwardly directed flange which is secured to a support component such as a drive shaft and the bearing inner ring has a radially inwardly directed flange which can be secured by screws, for example to the end surface of the shaft or axle. The bearing outer ring is provided with a cylindrical centering surface for centering guidance in a corresponding bore in the support component and the inner bearing ring is provided with a cylindrical centering surface for centering guidance on a corresponding section of the shaft or axle. A seal is provided at each end of the bearing between the outer bearing ring and a shoulder on the inner bearing ring. The advantages of this arrangement include the fact that the design forms a self contained bearing unit which can be completely reassembled and which therefore is capable of being installed and removed in an extremely simple and efficient manner. By reason of the flange mounting of both the outer ring and inner ring, the position of the bearing unit in the support component on the shaft is maintained even under extreme operating conditions. Consequently, only comparatively narrow regions of the bore in the support component and of the bore in the shaft need to be provided as a seating surface and even these surfaces need have only relatively coarse or liberal tolerances since they serve merely to center the inner and outer ring.

By reason of the fact that the preassembled unit is sealed, the bearing can be filled with a lubricant right from the start if desired and this eliminates the danger of using of an improper lubricant by installers of the unit.

The special design of the inner ring of the bearing or of the inner intermediate ring and the arrangement of the flange means that the shaft or axle can be foreshortened and thus result in a saving of material. The invention contemplates other more specific features discussed hereinafter are particularly important and valuable in designs used to support the shaft of a traction motor of an electrical traction vehicle in a motor housing. For example, the labyrinth seal can be equipped with a pulse transmitter and sensor for measuring rpm's and velocity of the vehicle. Further, the stationary bearing ring and/or the stationary intermediate ring can be provided with a receptacle or the like for a temperature sensor. Further, certain critical areas of the bearing assembly can be coated with an electrically insulating material to prevent current from passing through the bearing to the motor housing in the event of damage to the electrical parts of the motor. Thus, not only parts specific to the bearing, but also a considerable number of other elements are integrated into the design forming the bearing unit.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
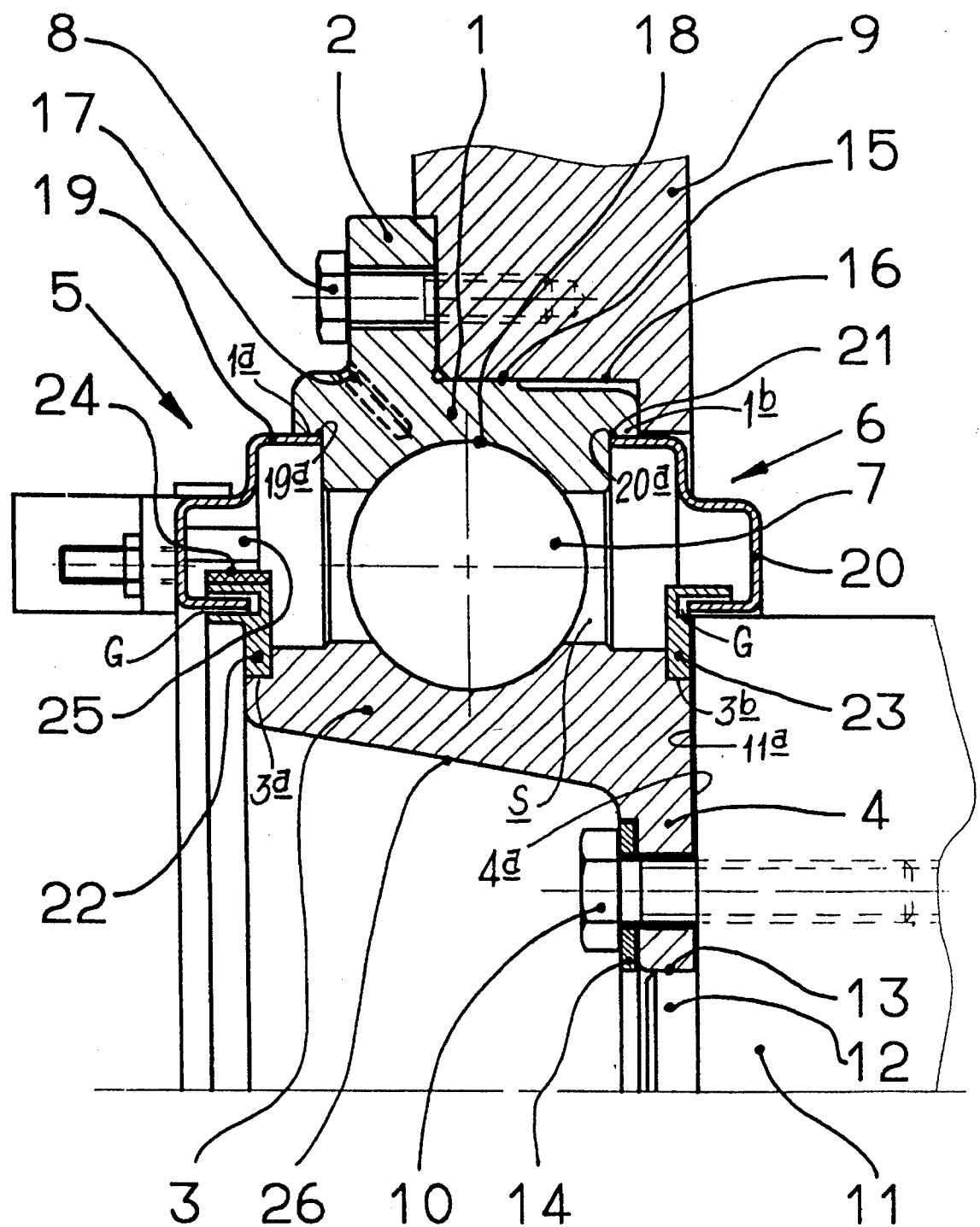
FIG. 1 is a transverse sectional view through a system for supporting a drive shaft of a traction motor of an electrical traction vehicle incorporating the present invention.

Referring now to the drawings and particularly to FIG. 1 thereof, there is shown a support system in accordance with the present invention. As illustrated, the system includes an outer ring 1 of a ball bearing having a circumferentially extending radially outwardly directed flange 2. The inner ring 3 of the bearing has a circumferentially extending inwardly directed flange 4. The bearing rings are spaced apart to define an annular spaces for a row of balls 7. Labyrinth seals 5, 6 are provided at each end of the space between the rings to seal off the intermediate spaces between the bearing rings 1 and 3. The flanges 2 and 4 of the bearing outer ring and inner ring respectively, are provided with a series of circumferentially spaced mounting holes for securing the bearing outer ring to the housing by hex-head screws 8. The bearing inner ring 3 is mounted by hex head screws 10 to the end surface $11^a$ of the drive shaft 11 of the traction motor. It is noted that expansion screws can also be used to mount the rings.

The flanges 2 and 4 are spaced apart axially and the flange 4 is located at one axial end of the ring whereby the bearing inner ring 3 is cantilevered and its cross section is preferably designed so that the ring acts as a support bracket of uniform strength. The configuration defines a conical inner bore 26.

Drive shaft 11 is provided at one axial end with a cylindrical stub 12 of a smaller diameter than the shaft which fits into bore 13 of flange 4 and serves to center bearing inner ring 3. If desired, the end surface $4^a$ of flange 4 contacting shaft 11, bore surface 13, the walls of the bores for mounting screws 10 and the contact surfaces with the ring shaped washer 14 can be coated with a layer of an electrically insulating material such as to prevent current from passing from shaft 11 to the bearing and then to the motor housing 9 in the event of damage to the electrical machine. It is noted that instead of coating washer 14, it can be made entirely of an insulating material.

Bearing outer ring 1 is centered by a relatively short, seat engaging surface 15 in bore 16 of motor housing 9. The outer bearing ring may be provided with a blind hole 17 which serves as a pocket for a temperature sensor. The pocket extends to a point closely adjacent the raceway 18 of the row of balls 7 for accurate monitoring of the temperature by a temperature sensor located in the pocket 17.

Both axial end faces of outer bearing ring 1 have recesses $1^a$ and $1^b$ milled therein to define seating surfaces for generally U-shaped outer sealing ring elements 19 and 20 of labyrinth seals 5 and 6. The parts can be secured by snapping a tab or bead $1^a$ and $1^b$ projecting from the outer edge of the sealing ring elements 19 and 20 into a ring shaped groove 21 in the inner portion of the recess $1^a$ and $1^b$ in the outer bearing ring 1. This provides a latching type mechanical connection. It is noted that these elements can be assembled by means of an adhesive as well.

Inner sealing ring elements 22 and 23 forming part of the labyrinth seals 5 and 6 are mounted on shoulders $3^a$ formed in inner bearing ring 3 by press fit. These inner ring sealing elements 222, 23 together with the outer sealing ring elements 19 and 20 form narrow sealing gaps G which prevent the intrusion of dirt and the uncontrolled escape of lubricant in the annular space between the bearing rings.

Labyrinth seal 5 may also be designed for a support for a device to measure rotational speed and velocity. To this end, a pulse transmitter ring 24 is mounted on the periphery of inner sealing ring element 22. The transmitter ring 24 has a sequence of magnetized zones of alternating polarity extending about its periphery. Outer sealing ring element 19 carries a sensor 25 positioned to scan the magnetized zones moving past it as shaft 11 rotates and thereby transmit corresponding signals to an electronic unit.

Figure 2:
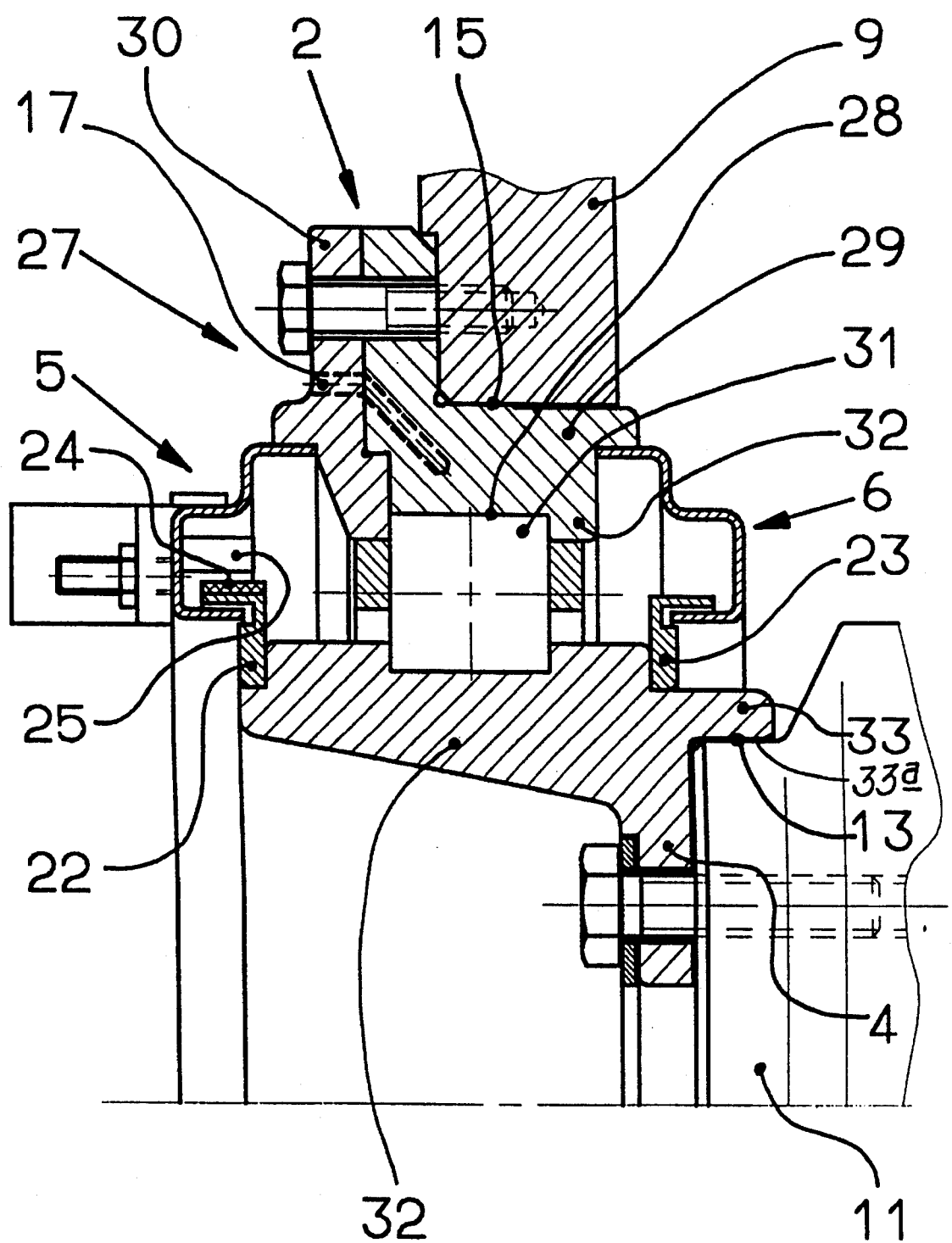
FIG. 2 is a transverse sectional view similar to FIG. 1 showing another embodiment of support system in accordance with the present invention.

FIG. 2 shows another embodiment of the present invention generally similar to that described in FIG. 1 in terms of the basic components. In accordance with this embodiment, the bearing is a cylindrical roller bearing and the outer bearing ring is designed in two parts consisting of a bearing ring element 29 having an outer raceway 28 for the cylindrical rollers 31 and a disk-like element 30 which serves simultaneously as a loose flange for the row of cylindrical rollers 31. The bearing ring element 29 has a complementary fixed flange 32 to contain the rollers in an axial direction.

Bearing inner ring 32 has a ring shaped projection 33 on one axial end thereof having a bore $33^a$ which centers the bearing inner ring 32 on the drive shaft 11.

Figure 3:
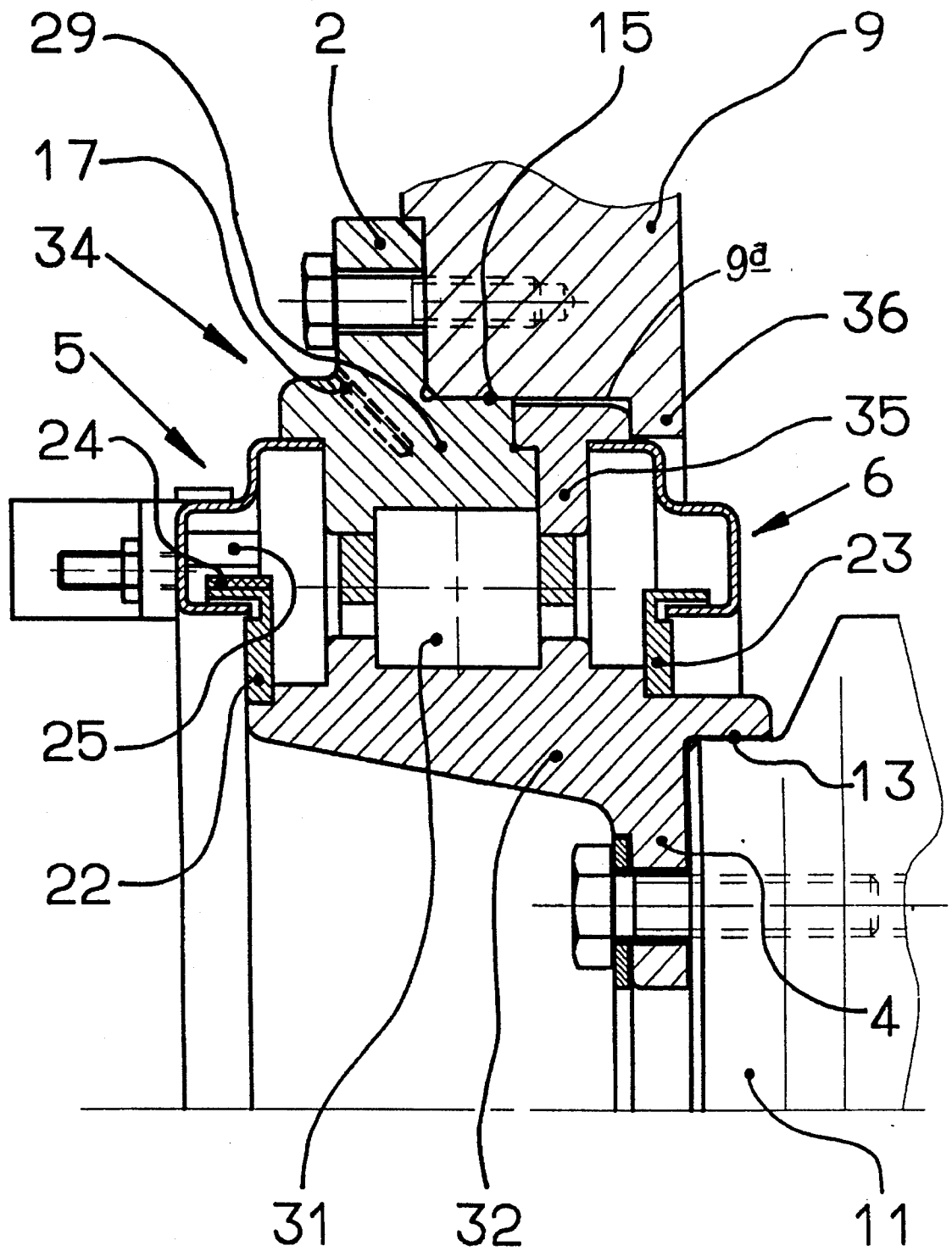
FIG. 3 is a transverse sectional view of still another embodiment of support system in accordance with the present invention.

FIG. 3 shows still another embodiment of the present invention which is similar to the embodiment of FIG. 2. In accordance with this embodiment, the outer ring likewise comprises two parts. However, in this instance, the disk 35 forms the loose flange at the inner axial end of the bearing assembly. The bore $9^a$ in motor housing 9 is provided with a shoulder 36 against which the disk 35 rests.

Figure 4:
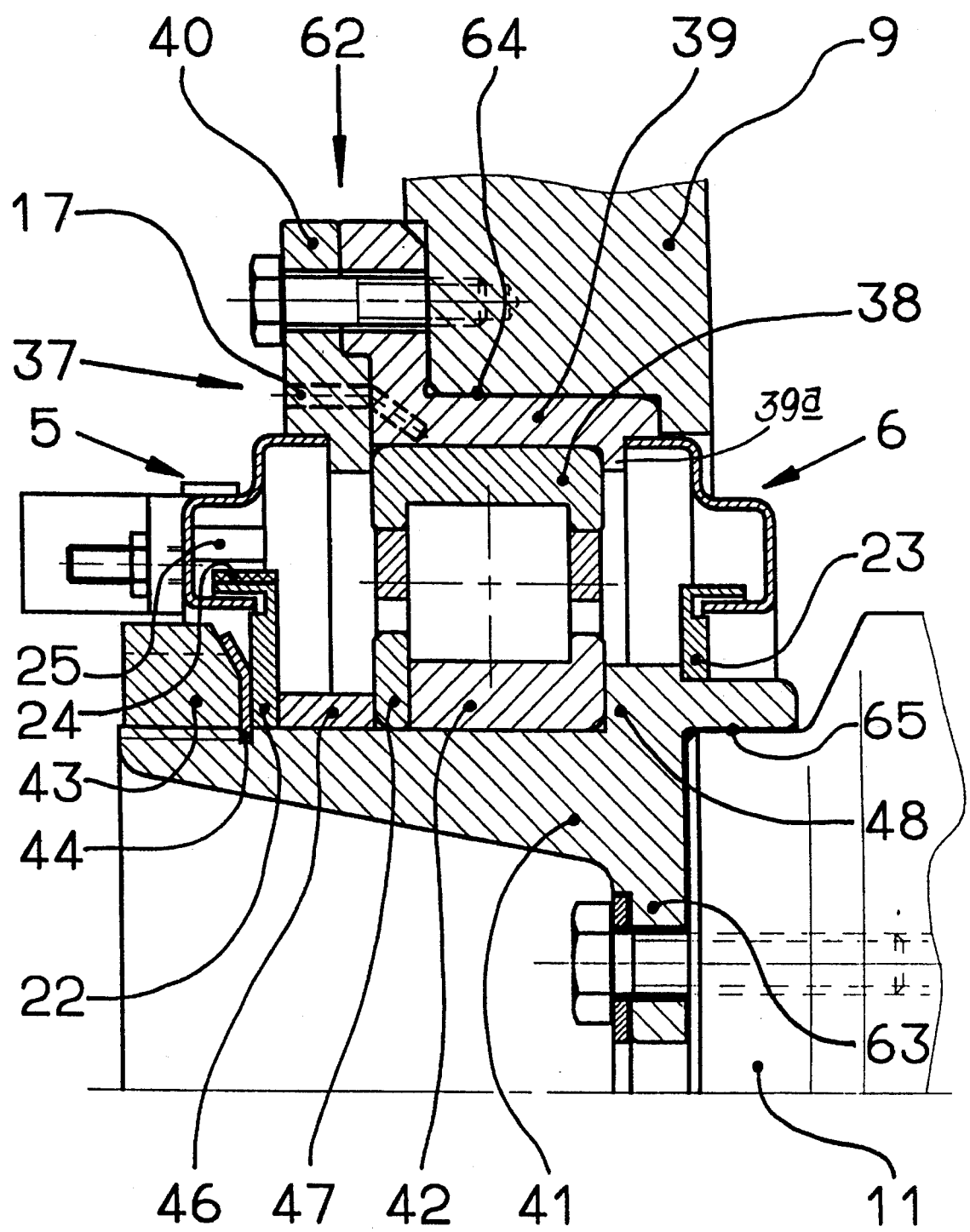
FIG. 4 is a transverse sectional view similar to FIG. 1 of another embodiment of a support system in accordance with the present invention.
Figure 5:
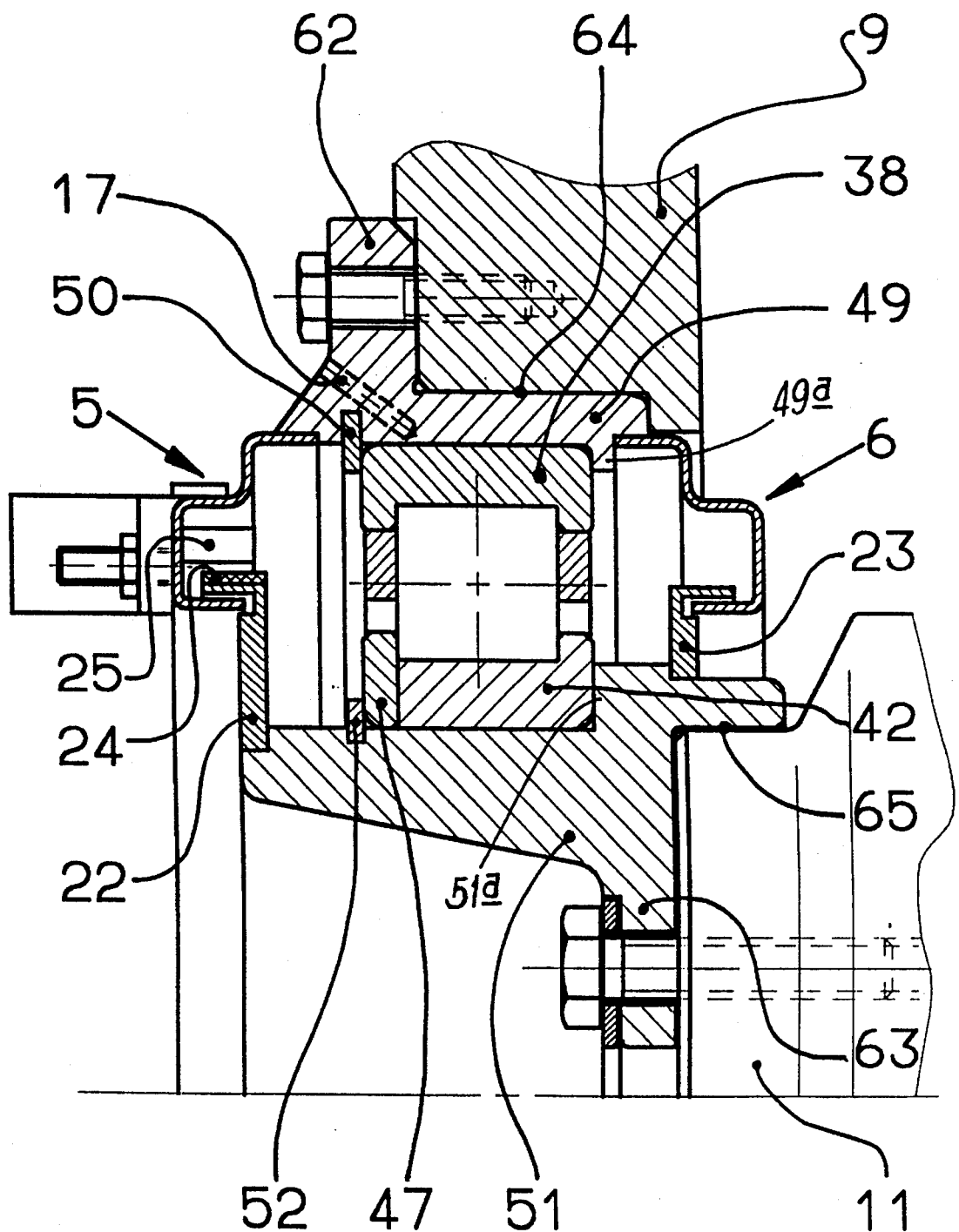
FIG. 5 is still another modified embodiment of a support system in accordance with the present invention.
Figure 6:
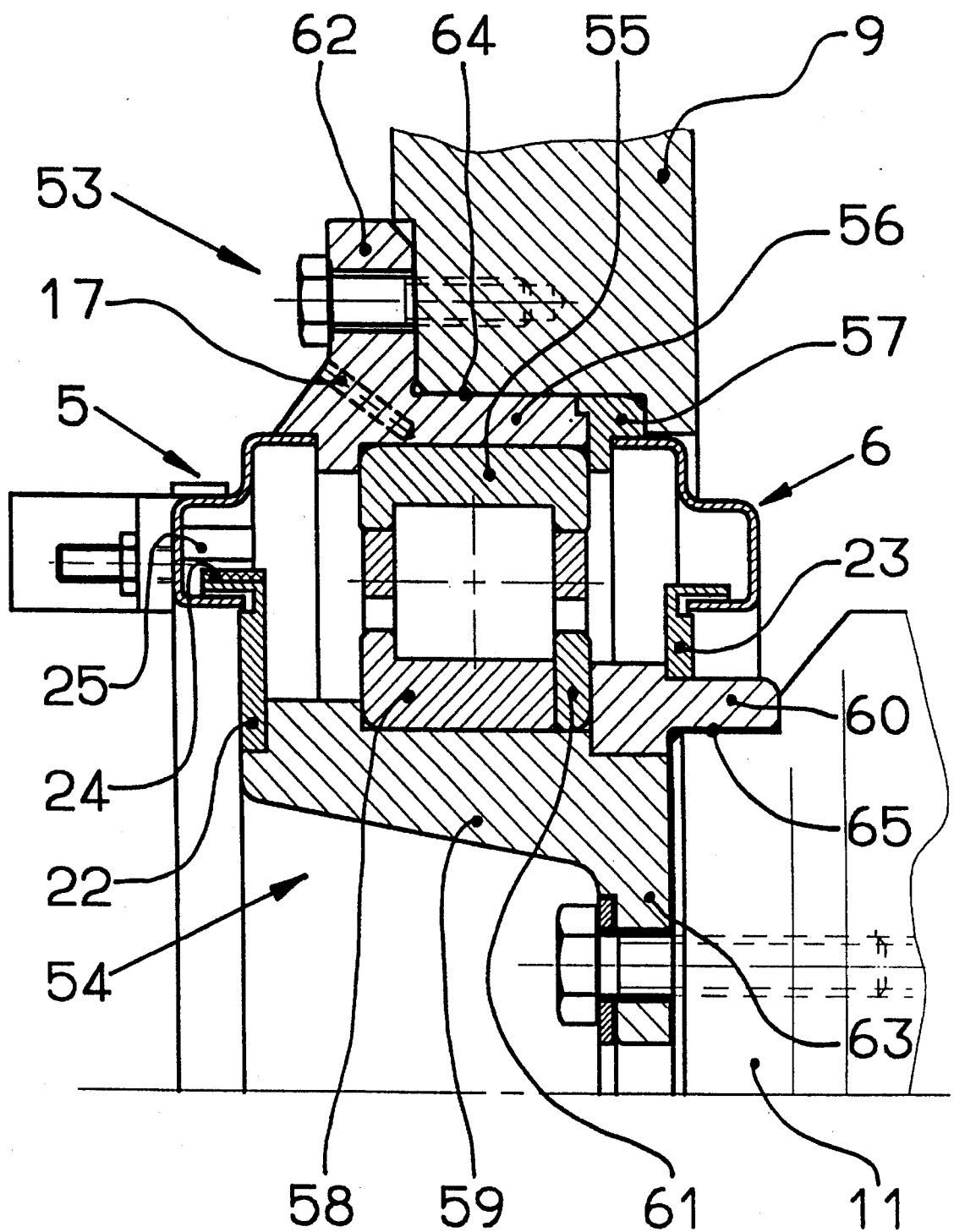
FIG. 6 is the further variation of a support system in accordance with the present invention.

The embodiments of the invention shown in FIGS. 4, 5 and 6, are configurations to accommodate standard bearings in a support assembly in accordance with the present invention.

In FIG. 4. the outer intermediate ring 37 consists of a two piece assembly including an intermediate ring 39 holding the bearing outer ring 38 and a disk 40 installed in front on the end surface. Bearing outer ring 38 rests against a fixed shoulder $39^a$ of intermediate ring element 39 and is held in place axially by disk 40 which together with a flange of intermediate ring 39 is fastened to a motor housing 9 by suitable fastening means such as screws.

Inner intermediate ring 41 is ranged to drive shaft 11 in the manner described in connection with the previous embodiments and carries bearing inner ring 42, which is held against a shoulder 48 formed on the intermediate ring by a ring-shaped nut 43 acting by way of a locking washer 44, inner sealing ring element 22, an intermediate ring 46, and a flange disk 47.

In the embodiment shown in FIG. 5, outer intermediate ring 49 is designated as a single piece. Bearing outer ring 38 is in this case held in place by a shoulder $49^a$ of intermediate ring 49 and a locking washer 50. Bearing inner ring 42, along with flange disk 47, is also held in place between a shoulder $51^a$ of inner intermediate ring 51 and a locking washer 52. Inner sealing ring elements 22, 23 are mounted on inner intermediate ring 51 in the same way as in FIG. 1.

In the embodiment shown in FIG. 6, both intermediate ring 53 and inner intermediate ring 54 are designated in two parts. In a manner similar to that described in connection with FIG. 3, outer intermediate ring 53 consists of an intermediate ring element 56 provided with the seating surface for bearing outer ring 55 and disk 57, located on the inside of the assembly, by means of which bearing outer ring 55 is held in place in the intermediate ring. In the same way, inner intermediate ring 54 also consists of an intermediate ring element 59 provided with the seating surface for the bearing inner ring and a disk 60, located on the inside of the assembly, which in this case serves not only to fix the bearing inner ring axially in place and to hold flange disk 61 in inner intermediate ring 54 but also to center the intermediate ring on drive shaft 11.

Even the particular embodiments of the present invention has been illustrated and described herein, it is not intended to limit the invention and changes and modifications may be made therein within the scope of the following claims.

What is claimed is:

1. A system for supporting a shaft member at one end of a support component, including a bearing inner ring and a bearing outer ring, a row of rolling elements in the space between the rings, characterized in that the bearing outer ring (1,27, 34) has a radially outwardly directed flange (2) which can be fastened to the support component (9), the bearing inner ring (3) (32) having a radially inwardly directed flange (4) which can be fastened to the end surface of the shaft member (11), a cylindrical centering surface (15) on the bearing outer ring (1), (27), (34) for centering guidance in a corresponding bore in the support component (9), a cylindrical centering surface (13) on the bearing inner ring for centering guidance on a corresponding section of the shaft member (11).

2. A system as claimed in claim 1 including a seal (5), (6) at each end of the bearing between the bearing outer ring (1), (27), (34) and a shoulder on the bearing inner ring (3), (32).

3. A system as claimed in claim 2 wherein the outer sealing ring elements (19), (20) of the labyrinth seals (5), (6) have a cross section essentially in the shape of a "U", where the outer axial shank is inserted in a corresponding recess milled into the bearing outer ring (1), (27), (34) or into the outer intermediate ring (37), (49), (53) and where the inner axial shank cooperates with the inner sealing ring element (22), (23) of the labyrinth seal (5), (6) to form a sealing gap.

4. A system as claimed in claim 3, wherein the outer axial shank of the outer sealing ring element (19), (20) of the labyrinth seal (5), (6) has at least one radially outward-directed tab, which can snap into a circumferential, ring-shaped groove (21) in the recess milled into the bearing outer ring (1), (27), (34) or into the outer intermediate ring (37), (49), (53).

5. A system as claimed in claim 2 wherein one of the labyrinth seals (5), (6) is provided with a pulse transmitter (24) for measuring the rotational speed and velocity.

6. A system as claimed in claim 2 wherein the seals (5), (6) are designed as labyrinth seals having outer sealing ring elements (19), (20) installed in a recess formed in the bearing outer ring (1), (27), (34), or outer intermediate ring (37), (49), (53) and inner sealing ring elements (22), (23) installed on a shoulder of the bearing inner ring (3), (32) or inner intermediate ring (41), (51), (54).

7. A system as claimed in claim 2, wherein the stationary bearing ring (1), (27), (34) and/or the stationary intermediate ring (37), (49), (53) has a receptacle (17) for a thermal sensor extending to within a short distance of the raceway for the rolling elements.

8. A system as claimed in claim 2, wherein the surfaces of the bearing inner ring (3), (32) or of the inner intermediate ring (41), (51), (54) making contact with the shaft or axle (11) and the surfaces thereof coming in contact with the shaft or axle (11) and the surfaces thereof coming in contact with the mounting screws (10) and/or possible washers (14) are provided with a layer of electrically insulating material.

9. A system as claimed in claim 1 wherein the flange surface of the bearing inner ring (3), (32) or of the inner intermediate ring (41), (51), (54) intended to make contact with the end surface of the shaft or axle (11) is mounted on the side nearer the shaft or axle (11) outside the center of the rolling element raceway.

10. A system as claimed in claim 9, wherein the flange surface forms the end surface of the bearing inner ring (3), (32), (41), (51), (54) or is situated near it.

11. A system as claimed in claim 10 wherein the bearing inner ring (3), (32) or the inner intermediate ring (41), (51), (54) has a conical bore, so that it forms a support bracket of uniform strength proceeding from a flange (4), (63).

12. A system as claimed in claim 1 wherein the bearing outer ring (38), (55) is installed in an outer intermediate ring (37), (49), (53) having a radially outwardly directed flange (62) for mounting to the support component (9) the bearing inner ring (42), (58) being mounted on an inner intermediate ring (41), (51), (54), having a radially inwardly directed flange (63) for mounting to the end surface of the shaft member (11), the outer intermediate ring (37), (49), (53) being provided with a cylindrical centering surface (64) for centering guidance in a corresponding bore in the support component (9), the inner intermediate ring (41), (51), (54) being provided with a cylindrical centering surface (65) for centering guidance on a corresponding section of the shaft member (11), and a seal (5), (6) at each end of the bearing between the outer intermediate ring (37), (49), (53) and the inner intermediate ring (41), (51), (54).

13. A system as claimed in claim 12 wherein the outer and/or the inner intermediate ring (37), (53), (54) is designed in two or more parts consisting of an intermediate ring element (39), (56), (59) with the seating surface for the bearing outer ring or bearing inner ring (38), (55), (58) and at least one disk (40), (60) situated on the end in front of the other element.

14. A system as claimed in claim 13 wherein the disk (40), (60) is designed to extend beyond the bore surface of the outer intermediate ring or beyond the lateral surface of the inner intermediate ring (37), (53), (54) to provide for the axial fixation of a bearing ring set (38), (55), (58) in or on the intermediate ring (37), (53), (54).

15. A system as claimed in claim 1 wherein at least one of the bearing rings (1), (3), (27), (3_), (34) is designed in at least two parts consisting of a bearing ring element (29) with the raceway for the rolling elements and at least one disk (30), (35) situated on the end in front of the other element.

16. A system as claimed in claim 15 wherein the disk (30), (35) is designed to project radially beyond the rolling element raceway to form a flange for the rolling elements (31).

17. A system as claimed in claim 1 wherein the surfaces of the bearing inner ring (3), (32) or of the inner intermediate ring (41), (51), (54) making contact with the shaft or axle (11) are provided with a layer of electrically insulating material, and in that an intermediate layer of insulating material 14 is provided between the opposing surfaces of the flange (4), (63) and the mounting screws (10).

* * * * *